UNITED STATES PATENT OFFICE.

TAKAKAZU HAYASHI AND UMEJIRO EMURA, OF TOKYO, JAPAN, ASSIGNORS OF FIFTY ONE-HUNDREDTHS TO KWANTO SANSO KABUSHIKI KAISHA, LTD., OF TOKYO, JAPAN.

PROCESS OF TREATING PHOSPHORIC ACID TO BE USED AS A CLARIFIER.

1,269,080. Specification of Letters Patent. Patented June 11, 1918.

No Drawing. Application filed May 24, 1917. Serial No. 170,605.

*To all whom it may concern:*

Be it known that we, TAKAKAZU HAYASHI and UMEJIRO EMURA, subjects of the Emperor of Japan, the former residing at No. 134 Komagome Hayashicho, Hongo, Tokyo, and the latter at No. 67 Takinokawa, Takinokawamachi, Kitatoshimagun, Tokyo, Japan, have invented certain new and useful Improvements in Processes of Treating Phosphoric Acid to be Used as a Clarifier, of which the following is a specification.

This invention relates to an improvement in a process of treating phosphoric acid to be used as a clarifier for treating sugar solution and consists in mixing a dilute solution of phosphoric acid such as is used for that purpose, with a suitable quantity of one or more calcium, aluminum or their salt or salts, heating the mixture to thereby cause the greater part of the free sulfuric acid, which is contained in the said dilute solution as an impurity, to react with the said calcium, aluminum or their salt or salts in order to produce the corresponding sulfate or sulfates, removing a large quantity of the water contained in the solution, by concentration *in vacuo*, then adding a suitable quantity of carbonaceous substances to be used as decolorizing substances for sugar purification, this latter being used in such amount as to produce a semi-solid mixture, and finally recovering the carbonaceous substances from the residue containing impurities after the treatment of the sugar solution, such recovering operation necessarily including a washing with a solution of phosphoric acid or phosphate or phosphates, so that the said substances are brought into condition to be used again. The object of this invention is to get simultaneously, the two results of clarifying and decolorizing sugar solutions, and to secure therewith a decrease in the cost of producing the mixed clarifier therefor by repeatedly using the carbonaceous substance or substances after recovering.

We will now proceed to explain the invention more fully.

This invention relates to a process of treating phosphoric acid to be used as for the clarifying of sugar solutions, and more especially of subsequently mixing the said phosphoric acid with one or more carbonaceous substances suitable for decolorizing sugar, for instance, bone black. The invention is characterized by the further treatment of the said mixed clarifier, so as to make use of such used and recovered carbonaceous substance, the purification of the recovered carbonaceous substance necessarily including the step of washing with a solution of phosphoric acid or of a phosphate or phosphates.

The dilute solution of phosphoric acid employed for this invention must be quite free from sulfuric acid, which impurity is difficult to avoid, being usually contained in "commercial" phosphoric acid such as is generally used in the sugar industry. The perfect elimination of free sulfuric acid contained in commercial phosphoric acid may be achieved in any suitable method, but the preferred method therefor is to mix the dilute solution of commercial phosphoric acid with a suitable quantity of a calcium or aluminum salt or salts, or other compound, then to heat the mixture up to a sufficiently high temperature to cause the said free sulfuric acid to combine with the said calcium or aluminum to produce the sulfate of one or both of these metals. This purified solution of phosphoric acid is then freed from the greater part of its water by concentration in a vacuum. When this solution is moderately concentrated one or more carbonaceous substances suitable for use as clarifying agents for sugar solutions, (for instance, bone black) is or are added to the said concentrated solution, the quantity of such substances being of course variable somewhat, but this should be added in such a proportion that the mixture will be in the form of a semi-solid or paste-like mixture.

If this final substance is thrown away after being used once, as has been the usual custom, this is not economical, because the carbon which undergoes no change during the purification of the sugar solution is largely lost. Therefore in our invention this carbon is recovered by the process hereinafter set forth. In such recovery this recovered carbonaceous decolorizing agent (or agents) is washed with a solution of phosphoric acid or of its salt or salts. Of course the residue of the bone black mixture, after the treatment of raw sugar solution purified by the said mixture of phosphoric acid and carbonaceous substance, contains more or less calcium, which has been necessarily added to the sugar solution in the first step of purifying operation thereof, this being in the form of phosphate insoluble in water, and also contains many other impurities as will be apparent. The most common method of recovering the decolorizing agents from such a residue is to heat it without access of air. But by such a procedure only, the calcium content cannot be eliminated. Therefore in the present invention this burnt product may be washed with dilute phosphoric acid or its salts in order to produce acid phosphate of lime, which is soluble in water and thus the calcium content can be removed. Or the said residue may be boiled with caustic soda solution, washed with hot water and then washed with the solution containing a very small quantity of impurities, (i. e. the solution after use of only few times). The product also may be directly washed with a solution of phosphoric acid or its salts and then washed with hot water, producing a product ready for re-use. The washed residue is dried, most conveniently by the use of a centrifugal filter, so that during the washing operation, water or hot water, etc., is supplied through a pipe at the center of said filter and after the washing operation, the supply of the liquid is stopped, the spinning of the filter being continued until the material is dry, which requires only a few minutes.

A specific example of this invention is given, as follows:—

A dilute solution of industrial or commercial phosphoric acid (obtained by treating phosphorite or bone black with sulfuric acid and filtration, said solution containing from 13 to 20 per cent. of phosphoric acid) is mixed with from 3 to 10 per cent. of aluminum or from 5 to 13 per cent. of aluminum hydroxid. This mixture is heated from 1 to 2 hours to a temperature of from 60 to 80° C. The aluminum, under the action of the heat, combines with the sulfuric acid contained in said solution of phosphoric acid and the free sulfuric acid is thereby removed. The solution is concentrated by vacuum distillation.

Powdered bone black or similar carbonaceous decolorizing substance is then added in amount sufficient to obtain a semi-solid mixture constituting the final product. The quantity of such carbonaceous substance to be added may be widely varied and may for instance be equal to one-half the quantity of the clarifier itself, (i. e. the phosphoric acid).

This product can then be used as a clarifier for sugar solution in the same manner as pure phosphoric acid clarifier, the sugar solution being at first stirred with the addition of milk of lime in the usual manner. The new clarifier is thereafter added, and the quantity thereof may be varied according to the percentage of impurities contained in the sugar solution to be purified.

To recover carbonaceous decolorizing agent from the residue obtained after the treatment of sugar solution by the above mentioned clarifier, one or more of the following methods are used according to the condition of the residue.

(First). When the quantity of impurities is relatively small (for instance, when the recovering operation has been repeated only a few times), the residue is washed with a solution of phosphoric acid of 2° to 5° Bé., or of phosphate or phosphates and then washed with hot water and dried.

(Second). When the quantity of impurities is somewhat greater, for instance, when the recovering operation is on material which has been used from four to seven times, the residue is heated in a steam jacketed vessel, together with a caustic soda solution of 5 to 10° Bé., or is heated by direct steam. After a suitable heating the substance is taken to a centrifugal filter and water and steam are supplied from the center of the centrifugal filter, while it is continuously rotated. After one or two hours, the supply of water and steam is cut off, and the mass washed with a solution of phosphoric acid or phosphate or phosphates of 5 to 7° Bé., after which again washed with hot water in the same manner and finally dried.

(Third). When the quantity of impurities is considerably greater, the residue is first heated sufficiently to char the organic material present, then washed with a solution of phosphoric acid or a phosphate of 10° or 15° Bé., and finally dried.

The carbonaceous substance remaining from the above-mentioned method and accordingly containing practically no impurities or only very small quantities thereof, can be used again for mixing with the phosphoric acid purified and concentrated as above described for treatment of sugar solution. Moreover, when the residue is treated by the third method above mentioned, the so-treated material may be further treated by the first or the second method, thus enabling the decolorizing agent or agents to be used almost permanently.

In carrying out the recovering operation according to the above mentioned methods which constitute the essential points of the invention, the best result is obtained when the recovered decolorizing agent is further washed by a dilute water solution of sulfurous gas or of sulfite or sulfites. This washing operation is preferably conducted just before the drying operation, but in some cases may precede the phosphoric acid treatment (or phosphate treatment).

We claim:

1. A process of treating used carbonaceous sugar-purifying material, which comprises the steps of washing the same with dilute phosphoric acid and thereafter mixing the residue with a more concentrated phosphoric acid substantially free from sulfuric acid, in such proportions as to produce a semi-solid mixture.

2. A process of treating used carbonaceous sugar-purifying material, which comprises the steps of heating the same with caustic alkali solution, and separating the resulting liquor, then washing with dilute phosphoric acid, and thereafter mixing the residue with a more concentrated phosphoric acid free from sulfuric acid in such proportions as to produce a semi-solid mixture.

3. A process of treating used carbonaceous sugar-purifying material, which comprises the steps of first charring the organic substances in the material, thereafter washing the same with dilute phosphoric acid and thereafter mixing the residue with a more concentrated phosphoric acid substantially free from sulfuric acid, in such proportions as to produce a semi-solid mixture.

In testimony whereof we have hereunto set our hands in presence of two subscribing witnesses.

TAKAKAZU HAYASHI.
UMEJIRO EMURA.

Witnesses:
  GENJI KURIBARA,
  SUGAO SOGAS.